United States Patent
Swallow

[11] Patent Number: 5,827,031
[45] Date of Patent: Oct. 27, 1998

[54] SELF STARTING FINISHING SCREW AND DRIVER TOOL

[76] Inventor: Gregory T. Swallow, 307 Croydon La., Manchester, Mo. 63021

[21] Appl. No.: 855,628

[22] Filed: May 14, 1997

[51] Int. Cl.[6] ............... F16B 25/00; F16B 35/04; F16B 35/06
[52] U.S. Cl. ............ 411/387; 411/396; 411/399; 411/403; 411/412
[58] Field of Search ................ 411/387, 386, 411/399, 402, 403, 404, 411, 424, 412, 413, 426, 396

[56] References Cited

U.S. PATENT DOCUMENTS

| | | | |
|---|---|---|---|
| 3,330,177 | 7/1967 | Oliver | 411/399 |
| 4,033,244 | 7/1977 | Jacobson | 411/399 |
| 4,653,244 | 3/1987 | Farrell | 411/399 |
| 4,808,051 | 2/1989 | Gietl | 411/399 |
| 5,015,134 | 5/1991 | Gotoh | 411/399 |
| 5,403,136 | 4/1995 | Mathys | 411/426 X |
| 5,425,407 | 6/1995 | Archuleta et al. | 411/426 X |

FOREIGN PATENT DOCUMENTS

| | | | |
|---|---|---|---|
| 4121751 | 1/1993 | Germany | 411/426 |
| 236466 | 7/1925 | United Kingdom | 411/403 |
| 1498827 | 1/1978 | United Kingdom | 411/403 |

*Primary Examiner*—Neill R. Wilson
*Attorney, Agent, or Firm*—Patent & Trademark Services; Joseph H. McGlynn

[57] ABSTRACT

A self starting finishing screw with a cylindrical shaft with a taper on one end and a tool engaging recess on the other end. The shaft is threaded along the entire length.

3 Claims, 1 Drawing Sheet

5,827,031

SELF STARTING FINISHING SCREW AND DRIVER TOOL

BACKGROUND OF THE INVENTION

This invention relates, in general, to threaded fasteners, and, in particular, to a self starting screw for finish woodworking and a tool for installing the screws.

DESCRIPTION OF THE PRIOR ART

In the prior art various types of screws and screw drivers have been proposed. For example, U.S. Pat. No. 4,033,244 discloses a screw and complimentary driver for use in inaccessible places, in which the driver has a V-shaped screw engaging means which engages a complimentary shaped portion on the screw head which maintains the screw on the driver head.

U.S. Pat. No. 4,653,244 discloses a fastener for wallboard with clockwise threads on one end of the screw and anti clockwise threads on an opposite end which auger and compact particulate material and tucks the material under the head of the screw.

U.S. Pat. No. 5,015,134 discloses a tapping screw with first and second drill edges formed on the pointed end of the screw and on an intermediate portion of the screw. The drill edges prevent cracking of the wood as the screw is driven in.

U.S. Pat. No. 4,808,051 discloses a wood screw which has a first threaded section and a second section without threads, but having annular projections. The annular projections allow the screw to be turned backwards without impairing the quality of the screw joint.

While all of the prior art devices work for their intended purposes, none of the devices address the problem associated with using finishing nails. These nails have a relatively small head so the head can be sunk beneath the outer surface of the wood, leaving a hole above the nail head. This hole can be filled with various products such as plastic wood, which will hide the nail head when dried.

However, because the nail heads are so small on finishing nails, they often become loose over time, thereby impairing the quality of the wood joint. What is needed is a screw-like device which has a head which can be hidden in a similar manner to the heads of finishing nails, but which will not work loose over time.

SUMMARY OF THE INVENTION

The present invention comprises a self starting finishing screw having a cylindrical shaft with a taper on one end and a tool engaging recess on the other end. The shaft is threaded along the entire length.

It is an object of the present invention to provide a new and improved threaded fastener.

It is an object of the present invention to provide a threaded fastener which will replace a finishing nail.

It is an object of the present invention to provide a threaded fastener which will replace the standard fastener used with wood working.

These and other objects and advantages of the present invention will be fully apparent from the following description, when taken in connection with the annexed drawings.

DESCRIPTION OF THE PREFERRED EMBODIMENT

Figure 1:
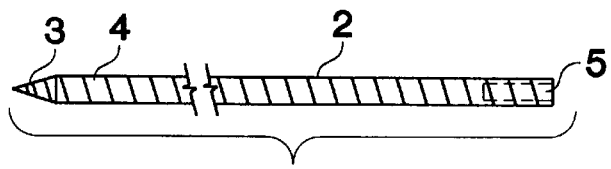
FIG. 1 is a side view of the present invention.
Figure 2:
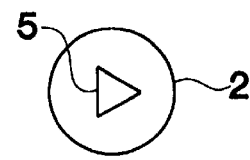
FIG. 2 is an end view of the present invention.

Referring now to the drawings in greater detail, FIG. 1 shows the threaded fastener of the present invention. The fastener is designed to replace the standard finishing nail and will come in all the standard sizes of finishing nails. The fastener has a shaft or shank 2 with a tool receiving recess 5 at one end. It should be noted that the recess 5 is shown as being triangular, however, this is merely for illustration purposes and other shapes could be used. For example, shapes such as, but not limited to, square and rectangular could be used. Obviously, the shape of the end 10 of the tool 9 which engages the recesses 5, 5', 5" would match the shape of the recess used.

At the opposite end of the fastener from the recess 5 is a tapered end 3 to assist in starting the fastener into the wood or other material being held by the fastener. The fastener 2 also has screw threads 4 which extend completely from one end of the fastener to the other.

The embodiment of the fastener shown in FIGS. 3–6 is intended to be used with wood and are modified slightly to work with this type of material. The fasteners of FIGS. 3–6 have a shaft or shank 2', 2" and a tool receiving recess 5', 5" which serve the same purpose as the shaft or shank 2 and the tool receiving recess 5 of FIG. 1. The threads 4' will be the type of threads used on conventional screws and will extend the entire length of the screws. The end 8, 8' of the fasteners 5', 5" will be enlarged slightly from the diameter of the shaft 2', 2" to provide extra holding for the wood.

Figure 3:
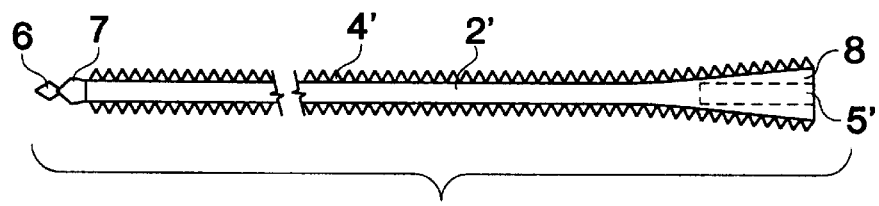
FIG. 3 is a side view of another embodiment of the present invention.
Figure 4:
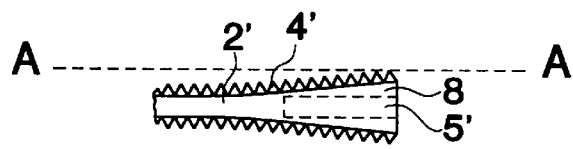
FIG. 4 is an enlarged partial side view of the embodiment of FIG. 3.
Figure 5:
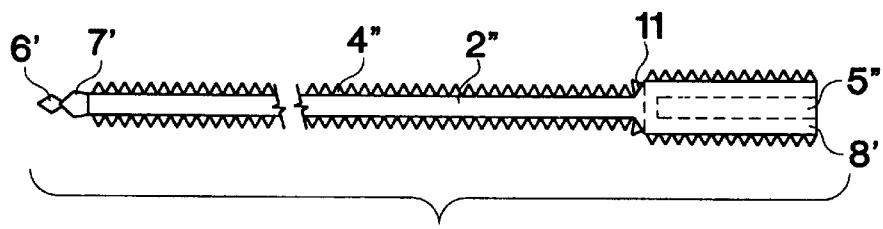
FIG. 5 is a side view of another embodiment of the present invention.
Figure 6:
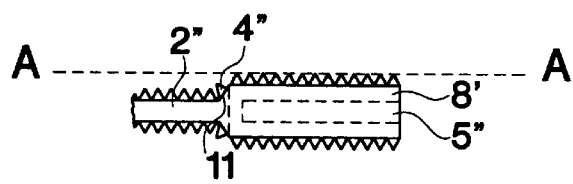
FIG. 6 is an enlarged partial side view of the embodiment of FIG. 5.

In the FIG. 3 embodiment, the end 8 is tapered, whereas the FIG. 4 embodiment has a shoulder 11 which connects the shaft 2" with the enlarged end 8'. However, the enlarged ends 8, 8' will work the same way and serve the same purpose.

Figure 7:
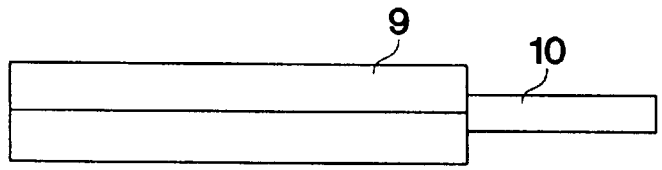
FIG. 7 is a side view of the tool used with the present invention.
Figure 8:
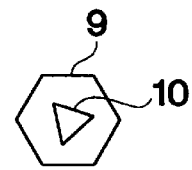
FIG. 8 is an end view of the tool used with the present invention.

FIGS. 7 and 8 show the tool used to apply the fasteners of FIGS. 1–6. The tool has a hexagon shape which can be engaged by standard tools such as a wrench to increase the turning power of the tool 9. It should be noted that other shapes such as, but not limited to, rectangular or pentagonal can be used without departing from the scope of the invention. The tool 9 will have an end 10 which is shaped to match the recesses 5, 5', 5". When the end 10 is inserted into the recesses of the fastener, the tool, either alone or used in conjunction with other tools such as a wrench, can be used to turn the fasteners into the material.

Since the fasteners of the present invention are threaded along their entire length, they can be used in place of standard finishing nails. In addition the fasteners of the present invention will not suffer from the disadvantages of the standard fasteners. For example, in the case of finishing nails which are used in wood working, the standard finishing nail has a small head which will provide little or no holding power. The head is designed to be countersunk so it will not show in the finished product. However, while the standard finishing nail will have a pleasing appearance when covered with a product such as wood putty, the wood pieces it joins may work loose after a period of time. The fasteners of the present invention do not suffer from this drawback since the screw threads, which extend the entire length of the shaft will provide the holding power to maintain the wood joint over a long period of time. In fact, when used with wood the FIG. 1 embodiment can have a head which is the same size as the shaft 2. This will make it easier to "hide" the fastener, since it will produce a hole in the wood which is smaller than the hole made by the slightly larger head on a standard finishing nail.

In addition, the pointed tip 3 will make the fastener of FIG. 1 self starting so a pilot hole will not have to be drilled before using the fastener. Also, the fasteners of FIGS. 3–6 have a double diamond shaped end 6, 6', which will make the fasteners self starters. The small diamond shape 6, 6' will start a hole in the material and then the larger diamond shape 7, 7' will have an easier time in enlarging the initial hole and allowing the shaft of the fastener to enter the hole.

Although the Self Starting Finishing Screw and Driver Tool and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A threaded fastener comprising:

a shaft having a length, a diameter and a circumference, said shaft having a reduced diameter portion at one end, said shaft having a means for engaging a tool on another end, said shaft having screw threads extending along the complete length thereof, and wherein said reduced diameter portion of said shaft has a pair of diamond shaped portions, one of said diamond shaped portions being smaller than the other.

2. A threaded fastener in combination with a tool, said threaded fastener comprising:

a shaft having a length, a diameter and a circumference, said shaft having a reduced diameter portion at one end, said shaft having a means for engaging a tool on another end, said shaft having screw threads extending along the complete length thereof, and said tool comprising a second tool engaging surface on one end and a projection on an opposite end, said projection having a shape which matches the shape of said recess.

3. The threaded fastener as claimed in claim 2, wherein said projection is triangular shaped.

* * * * *